D. G. CASWELL.
VELOCIPEDE.
APPLICATION FILED JUNE 6, 1910.
984,648.
Patented Feb. 21, 1911.
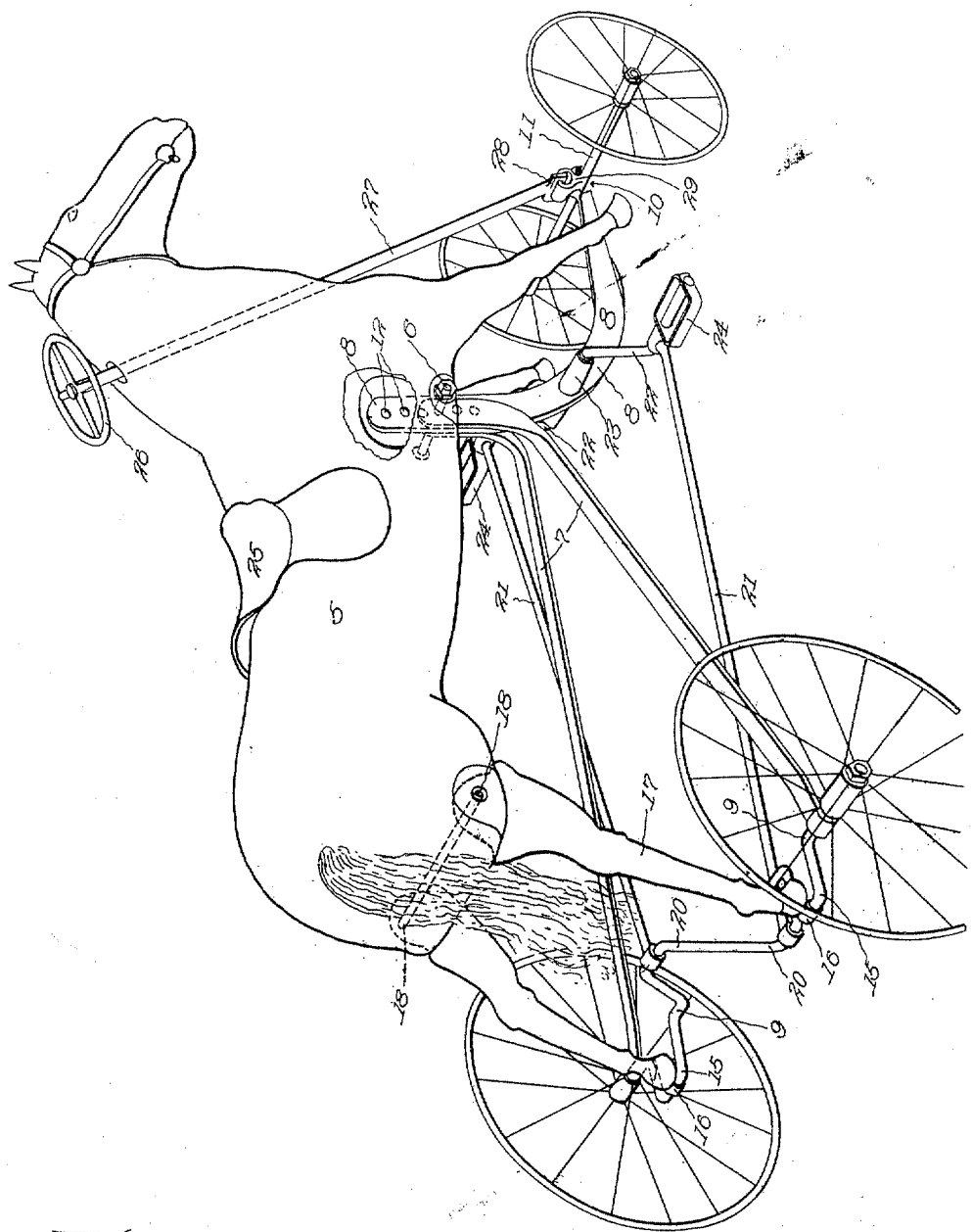
Witnesses
Elwood H. Bartelow
Fred A. Willis
Inventor
Daniel G. Caswell
by James T. Bartelow
his Attorney.

UNITED STATES PATENT OFFICE.

DANIEL G. CASWELL, OF LOS ANGELES, CALIFORNIA.

VELOCIPEDE.

984,648.      Specification of Letters Patent.      Patented Feb. 21, 1911.

Application filed June 6, 1910. Serial No. 565,169.

*To all whom it may concern:*

Be it known that I, DANIEL G. CASWELL, a citizen of the United States, residing at Los Angeles, in the county of Los Angeles and State of California, have invented new and useful Improvements in Velocipedes, of which the following is a specification.

This invention relates to a velocipede having therein a novel combination to produce a new, interesting and instructive toy. The combination broadly comprises the features of a rocking or hobby horse with a velocipede movement, the specific invention consisting in the arrangement of the frame and propelling mechanism. The combination is so arranged that the figure of a horse, upon which the driver sits, is rocked by the movement of the velocipede. The movement of the vehicle is effected by means of a pedal mechanism, located conveniently to the rider on the horse. The steering is accomplished by means of a simple mechanism reaching to a point directly in front of the rider at a position approximately where the driving reins are usually reached.

The mechanism consists mainly of a three or four wheeled vehicle especially arranged for carrying pivotally near its center the horse's figure. The rear axle of the vehicle is provided with cranks on which the rear feet of the figure are mounted. When the axle rotates as the vehicle moves over the ground, the rear end of the figure is oscillated so as to reproduce more or less exactly a true equine motion. The vehicle is propelled, in the present case, by means of pedals mounted on the vehicle frame under the figure. Connecting rods connect the pedal cranks with cranks on the rear axle. Although this construction is simple, effective and inexpensive, it may be replaced by other forms of connection such as a sprocket and chain.

In the accompanying drawings: the figure illustrates my complete invention.

Referring to these drawings, 5 designates the figure of a horse which is provided with a pivotal supporting bolt 6 at a point on its underside and directly behind its fore legs. Secured by bolt 6 are frame members 7 and 8, members 7 extending rearwardly and downwardly to encompass rear axle 9, and member 8 extending forwardly and downwardly to be swivelly connected at 10 to front axle 11. The ends of frame members 7 and 8 are all turned upwardly to pass up into the figure as is shown in dotted lines, bolt 6 passing through their vertical ends. Member 8 is provided with a series of holes 12 so that it may be adjusted in position for a purpose to be hereinafter stated.

Rear axle 9 is provided with two cranks 15 to which are pivotally attached at 16 the feet of hind legs 17 of the figure. Legs 17 are pivoted at 18 to the body of the figure so that, upon the rotation of shaft 9 an oscillating movement of the figure is set up around the pivotal point of support 6. The rear axle is further provided with a pair of cranks 20, situated opposite to each other and connected by rods 21 to pedal cranks 22. Pedal cranks 22 are journaled at 23 on frame member 8 in a convenient position for pedals 24 to be reached by the feet of the driver. Adjustment of the position of frame member 8 will be seen to vary the distance between the pedals and the rider's seat 25. At the same time this adjustment does not interfere with the distance between the pedal cranks and the rear axle cranks, as frame member 8 is only pivotally connected through bolt 6 to the figure and the position of the pedal cranks is always determined by connecting rods 21.

The guiding of the vehicle is accomplished through the medium of a hand wheel 26 mounted on steering post 27 which connects at 28 with a bolt 29 connected with front axle 11. By turning hand wheel 26 the front axle may be turned to guide the vehicle in any direction. In order to facilitate turning it is preferred that only one of the rear wheels be mounted rigidly upon the rear axle. The other rear wheel is loose so as to avoid slipping in rounding curves.

It will be seen that my vehicle combines the advantages of a velocipede with those accruing from an equine motion. The oscillations of the figure represent more or less closely the galloping motion of a horse. There is always sufficient side swaying to imitate the lateral movements of the horse, while passing around curves affords the driver opportunity for learning to balance himself.

The frame construction, in which my invention particularly resides, provides a simple means for adjustably supporting the figure on the wheels, the pivotal attachment of the front and rear frames allowing the distance between the pedal and crank axles to always remain constant, the distance being determined by the length of the connecting rods.

Having described my invention, I claim:

1. A device of the character described, comprising supporting and traction wheels, a crank axle rigidly secured to a traction wheel and having a plurality of cranks thereon, a steering axle connected to a supporting wheel, frame members connected to the crank axle and the steering axle and joining each other at one point, a figure pivotally supported on the frame members at their point of juncture, connecting means between the figure and a pair of cranks on the crank axle, a pedal crank journaled on one of the frame members, and connecting means between the pedal crank and a crank upon the crank axle.

2. A device of the class described, comprising front and rear axles, wheels mounted on the axles, a frame member pivotally attached to the front axle, a pair of frame members attached to the rear axle, all three frames extending toward each other to a point intermediate the wheels, means for securing the members together at the point of juncture, pedal cranks mounted on the front frame member, cranks on the rear axle, and connecting rods between the pedal cranks and the rear axle cranks.

3. A device of the class described, comprising front and rear axles, wheels mounted on the axles, a frame member pivotally attached to the front axle, a pair of frame members attached to the rear axle, all three frames extending toward each other to a point intermediate the wheels, means for securing the members together at the point of juncture, pedal cranks mounted on the front frame member, cranks on the rear axle, connecting rods between the pedal cranks and the rear axle cranks, a figure pivotally mounted on the frame members at their point of juncture, and connective means whereby the figure is oscillated by the rotation of the rear axle.

4. A device of the class described, comprising a steering and a crank axle, a steering wheel mounted on the steering axle, a pair of wheels mounted on the crank axle, a frame member pivotally connected with the steering axle, a pair of frame members connected to the crank axle, all three members extending to a common point of juncture, means for securing the members together at the point of juncture, pedal cranks mounted on the steering axle frame member, cranks on the crank axle, and connecting means between the pedal cranks and the cranks on the crank axle.

5. A device of the class described, comprising a steering and a crank axle, wheels supporting the axles, a frame mounted on each of the axles and connected together at one point, cranks on the crank axle, pedal cranks mounted on the steering axle frame, and connecting means between the pedal cranks and the cranks on the axle.

In witness that I claim the foregoing I have hereunto subscribed my name this 28th day of May 1910.

D. G. CASWELL.

Witnesses:
    James T. Barkelew,
    Elwood H. Barkelew.